United States Patent [19]

Malik et al.

[11] Patent Number: 6,028,921
[45] Date of Patent: Feb. 22, 2000

[54] METHOD AND SYSTEM FOR DELIVERY OF A MESSAGE TO A DISPLAY UNIT

[75] Inventors: Dale W. Malik, Atlanta; Robert A. Koch, Norcross, both of Ga.

[73] Assignee: BellSouth Intellectual Property Corporation, Wilmington, Del.

[21] Appl. No.: 08/873,341

[22] Filed: Jun. 11, 1997

[51] Int. Cl.[7] .............................. H04M 1/64; H04M 3/42; H04M 3/00

[52] U.S. Cl. .................... 379/201; 379/67.1; 379/88.01; 379/212; 379/242

[58] Field of Search ............................... 379/67.1, 88.01, 379/93.23, 201, 210, 212, 88.18, 69, 76, 242

[56] References Cited

U.S. PATENT DOCUMENTS

| | | | |
|---|---|---|---|
| 4,972,461 | 11/1990 | Brown et al. | 379/67 |
| 5,187,735 | 2/1993 | Herrero Garcia et al. | 379/88 |
| 5,327,486 | 7/1994 | Wolff et al. | 379/96 |
| 5,414,754 | 5/1995 | Pugh et al. | 379/67 |
| 5,481,594 | 1/1996 | Shen et al. | 379/67.1 |
| 5,583,920 | 12/1996 | Wheeler, Jr. | 379/88.01 |
| 5,604,791 | 2/1997 | Lee | 379/67.1 |
| 5,724,412 | 3/1998 | Srinivasan | 379/93.23 |
| 5,764,731 | 6/1998 | Yablon | 379/88.01 |
| 5,873,032 | 2/1999 | Cox et al. | 455/414 |

*Primary Examiner*—Fan S. Tsang
*Assistant Examiner*—Allan Hoosain
*Attorney, Agent, or Firm*—Nora M. Tocups; Kilpatrick Stockton LLP

[57] ABSTRACT

A method and system for transmitting a message obtained from a message delivery database in a calling name delivery service environment. A communication is received from a calling party directory number and directed to a code number. In response to the communication, a called party directory number associated with the communication is obtained. Next, an indication of a selected message is received from a list of messages. A prefix corresponding to the selected message is obtained from the message delivery database. The prefix and the calling party directory number are populated in a signaling message pertaining to the communication. The signaling message containing the prefix and the calling party directory number is transmitted to a network element serving the called party directory number. In response to receipt of the signaling message of the network element, a message translation of the prefix is obtained from a message translation database, and the message translation is transmitted to a called party display unit.

24 Claims, 8 Drawing Sheets

METHOD AND SYSTEM FOR DELIVERY OF A MESSAGE TO A DISPLAY UNIT

TECHNICAL FIELD

The present invention relates generally to telecommunications systems, and more particularly, relates to a method and system for the delivery of a message to a display unit.

BACKGROUND OF THE INVENTION

A wide variety of communications services are available to a user of a modern public switched telephone network (PSTN). These services include voice mail, conference calling, call forwarding, and calling name delivery (CNAM). CNAM is considered a valuable service by many users because it allows a called party to view information about a calling party on a display unit. Specifically, when the called party receives a call, information including the calling party's name and directory number, as well as the date and time of the call may be transmitted to the display unit. Unfortunately, this information is generally the only information that can be transmitted regarding the calling party. The calling name delivery service would be considered even more valuable by some users if a called party was provided with additional information about a calling party.

Today, the delivery of calling name information is typically implemented in accordance with the model illustrated in FIG. 1, which is a prior art diagram of the CNAM operating environment. Referring to FIG. 1, a calling party, Veda, picks up the telephone and dials the directory number of a called party, who is also a CNAM subscriber, Dale. In this example, Veda dials 770-555-6789. Next, a switch 1 (Office B) serving Veda obtains routing information and populates an initial address message (IAM) with certain information. The IAM is a parameter that exists within an integrated services digital network user part (ISUP) signaling message. An ISUP signaling message employs a Common Circuit Signaling System 7 (CCS7) call setup protocol. In particular, the IAM is populated with Veda's directory number (770-555-1234), Dale's directory number (770-555-6789), and a presentation parameter. The presentation parameter allows a CNAM display.

Office B then sends this information in the signaling message to an end office 2 (Office A) serving Dale. Office A recognizes that the call is for a CNAM subscriber, so Office A halts the calling process to launch a calling name query on the CCS7 network. As a part of the query launch, Office A populates a called party address parameter in the query with Veda's directory number, 770-555-1234. The called party address parameter is a routing parameter within an Advanced Intelligence Network (AIN) query package.

After Office A has populated the called party address parameter, the calling name query is sent to a signaling transfer point (STP) 3. The STP 3 performs a global title translation (GTT) on the called party address parameter to determine to which a serviced control point (SCP) the calling name query should be routed. This determination is made based on the first three digits in Veda's directory number, in this case, 770. The STP 3 then forwards the calling name query to the appropriate SCP 4. The SCP 4 searches a CNAM database 5 for Veda's record from which the SCP 4 retrieves the associated name. The CNAM database 5 is located preferably as a part of the SCP 4, as shown in FIG. 1, but may be separate from the SCP 4, or incorporated as part of another network element such as a service node or even a switch.

The SCP 4 returns the name associated with Veda's directory number in a transaction capability application part (TCAP) response to Office A. The TCAP response is the final message containing instructions on how to handle the call. The TCAP response message ends the SSP/SCP transaction that began with the calling name query. In this example, Veda Christmas (full name) is returned in the TCAP response to Office A.

When Office A completes the call to Dale, Office A sends the calling party's name, Veda Christmas, and Veda's directory number, 770-555-1234, as well as the date and time of the call over Dale's line to Dale's display unit 6. This information is then displayed on Dale's display unit 6.

In sum, CNAM is designed to send a calling party's name and directory number to a called party. One of the main purposes of CNAM is to allow a called party to scan an incoming calls log on a display unit. The log lists the calling party's name, directory number, date and time of an incoming call. The called party is able to view this information without having to answer the call. In addition, the called party is able to determine who has called without having to check an answering machine or voice mail system.

As unique and useful as the CNAM service is in providing calling party information, the principle disadvantage of the present CNAM service is that the called party cannot retrieve any additional information about the call. Specifically, the present system does not provide a mechanism for sending messages with the call. Therefore, there is a need for an improved system and method that allow for a message to be delivered with a call.

SUMMARY OF THE INVENTION

The present invention satisfies the above-described need by providing a method and system for delivering a message to a display unit. The present invention utilizes a message delivery database and a message translation database in a calling name environment.

By providing an improved system that allows the delivery of messages with a call or communication, other benefits result. The present invention allows a calling party to transmit messages to a called party without utilizing a voice mail or answering service or directly speaking with the called party or representative. For instance, a calling party may desire to leave messages for called parties informing them of a meeting time and date without having to speak with each called party or to leave each called party a voice mail message. In addition, the present invention allows a called party to determine the nature of an incoming call while continuing a conversation with another caller.

Generally described, the present invention provides a method for transmitting a message obtained from a message delivery database in a calling name delivery service environment. In one embodiment of the present invention, a communication is received from a calling party directory number and directed to a code number. In response to the communication, a called party directory number associated with the communication is obtained. Next, an indication of a selected message from a list of messages is received. A prefix corresponding to the selected message is obtained from the message delivery database. The prefix and the calling party directory number are populated in a signaling message pertaining to the communication. The signaling message containing the prefix and the calling party directory number is transmitted to a network element serving the called party directory number. In response to receipt of the signaling message of the network element, a message translation of the prefix is obtained from a message translation database, and the message translation is transmitted to a called party display unit.

With respect to the embodiment described in the immediately preceding paragraph, the message translation is typically displayed on the called party display unit. Also, when populating the prefix and the calling party directory number in a signaling message, the prefix is placed in front of the calling party directory number so that the prefix precedes the calling party directory number. In addition, the called party directory number and the selected message are generally provided by a calling party.

Furthermore, with respect to this embodiment, typically, a determination is made as to whether the selected message is accurate before obtaining the prefix corresponding to the selected message from the message delivery database. If the selected message is accurate, then a confirmation signal is received. If the selected message is inaccurate, then a cancellation signal is received, in which case the step of receiving an indication of a selected message from a list of messages is repeated.

In another embodiment of the present invention, a communication from a calling party directory number and directed to a code number is received. In response to receiving the communication, a called party directory number associated with the communication is obtained. With respect to the communication, an indication of a selected message is received from a list of messages. A prefix corresponding to the selected message is obtained. The prefix and the calling party directory number are populated in a signaling message associated with the communication. Finally, the signaling message containing the prefix and the calling party directory number is transmitted to a network element serving the called party directory number.

With respect to the embodiment described in the immediately preceding paragraph, a message translation of the prefix is obtained from a message translation database in response to receipt of the signaling message of the network element, and the message translation is transmitted to a called party display unit. The message translation is typically displayed on the called party display unit. Also, when populating the prefix and the calling party directory number in a signaling message, the prefix is placed in front of the calling party directory number so that the prefix precedes the calling party directory number. In addition, the called party directory number and the selected message are generally provided by a calling party.

Furthermore, with respect to this embodiment, typically, a determination is made as to whether the selected message is accurate before obtaining the prefix corresponding to the selected message from the message delivery database. If the selected message is accurate, then a confirmation signal is received. If the selected message is inaccurate, then a cancellation signal is received, in which case the step of receiving an indication of a selected message from a list of messages is repeated.

The present invention also provides a system for transmitting a message obtained from a message delivery database in a calling name delivery service environment. In this system, a first network element is operative to receive a communication from a calling party directory number and directed to a code number. The first network element is further operative to provide the message delivery database with the code number, a called party directory number, and an indication of a selected message. The message delivery database is functionally connected to the first network element and is operative to obtain a prefix corresponding to the selected message and to provide the prefix corresponding to the selected message to the first network element. The first network element is further operative to populate the calling party directory number and the prefix corresponding to the selected message in a signaling message relating to the routing of the communication and to transmit the signaling message to a second network element.

With respect to the embodiment described in the immediately preceding paragraph, the system preferably includes a message translation database functionally connected to the second network element and operative to obtain a translation message corresponding to the prefix. The message translation database is further operative to provide the translation message to the second network element. The second network element is operative to transmit the translation message to a called party display unit, where the called party display unit displays the message translation. Moreover, the calling party directory number and the prefix corresponding to the selected message is populated in the signaling message so that the prefix precedes the calling party directory number.

In another embodiment of the present invention, a first network element is operative to receive a communication from a calling party directory number and directed to a called party directory number and is operative to transmit a signaling message relating to the routing of the communication to a second network element. The second network element is operative to route the communication to a third network element after a predetermined time period. The third network element, which is functionally connected to the second network element, is operative to forward the communication to the first network element, where the communication is directed to a code number. The first network element is further operative to provide the message delivery database with the code number, a called party directory number, and an indication of a selected message. The message delivery database, which is functionally connected to the first network element, is operative to obtain a prefix corresponding to the selected message and to provide the prefix corresponding to the selected message to the first network element. The first network element is further operative to populate the calling party directory number and the prefix corresponding to the selected message in a signaling message relating to the routing of the communication and to transmit the signaling message to the second network element. A message translation database, which is functionally connected to the second network element, is operative to obtain a selected message from the list of messages. The second network element is further operative to transmit the selected message to a called party display unit.

With respect to the embodiment described in the immediately preceding paragraph, the called party display unit is operative to display the selected message on the called party display unit. In addition, the third network element is further operative to record an audio message.

Therefore, it is an object of the present invention to provide an improved system and method that allow for a message to be delivered with a call.

These and other objects, features, and advantages of the present invention may be more clearly understood and appreciated from a review of the following detailed description of the disclosed embodiments and by reference to the appended drawings and claims.

DETAILED DESCRIPTION

The present invention is directed to a system and method for the delivery of a message to a display unit in a CNAM environment. In addition to utilizing the Advanced Intelligent Network (AIN) elements used for conventional delivery of calling name information associated with a calling party, the present invention utilizes a message delivery database and a message translation database for also delivering a message from the calling party to a called party. The message delivery database is designed to provide a list of messages for selection by the calling party and to properly code the selected message for transfer from one switch to another switch. The message translation database is designed to translate the coded message for delivery to the called party. The discussion that follows describes the preferred environment of the present invention and then describes an exemplary method and system of the present invention for delivery of a message in a CNAM environment.

Overview Of The Preferred Environment

Figure 1:
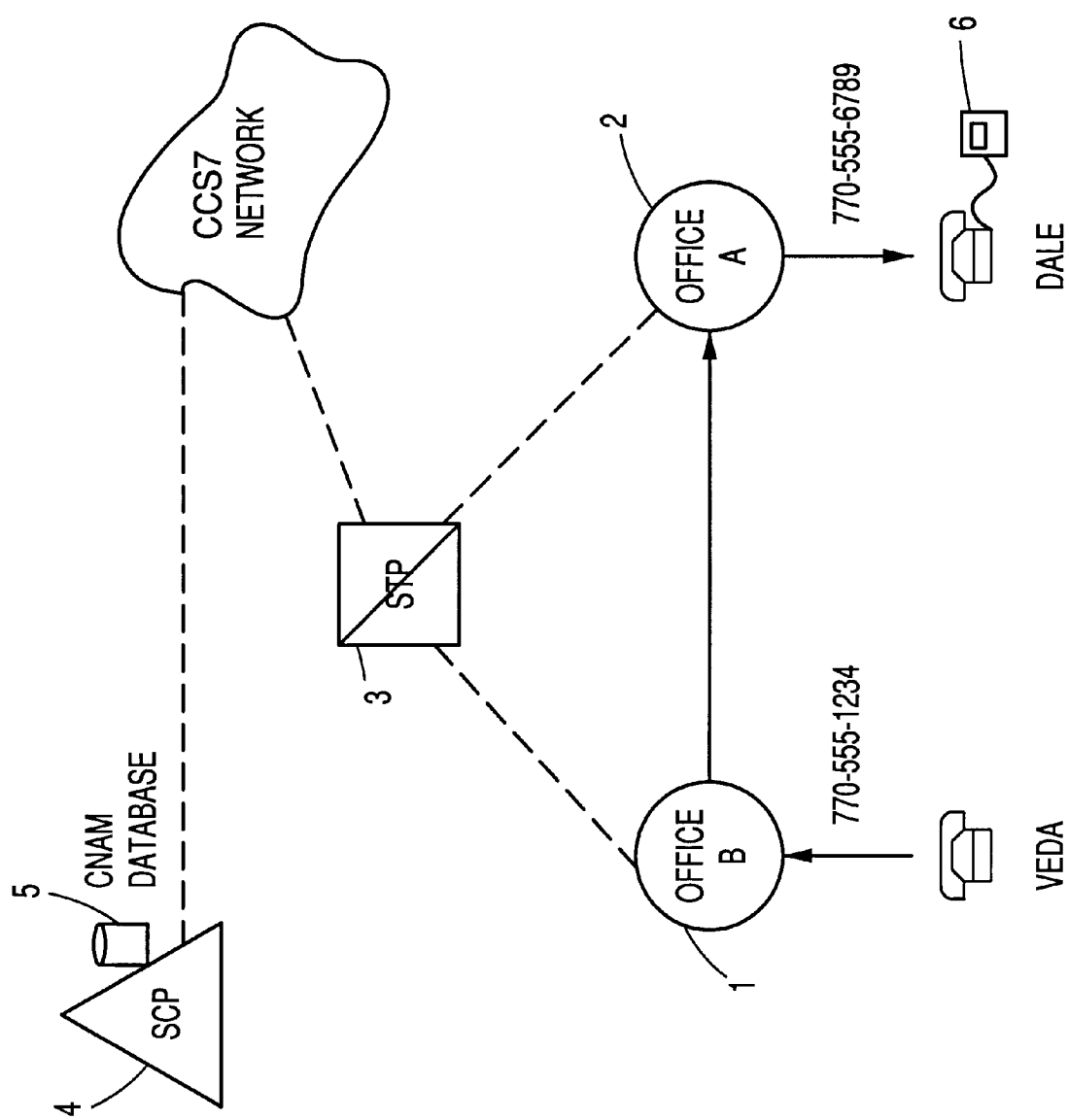
FIG. 1 is a prior art diagram illustrating the CNAM operating environment.
Figure 2:
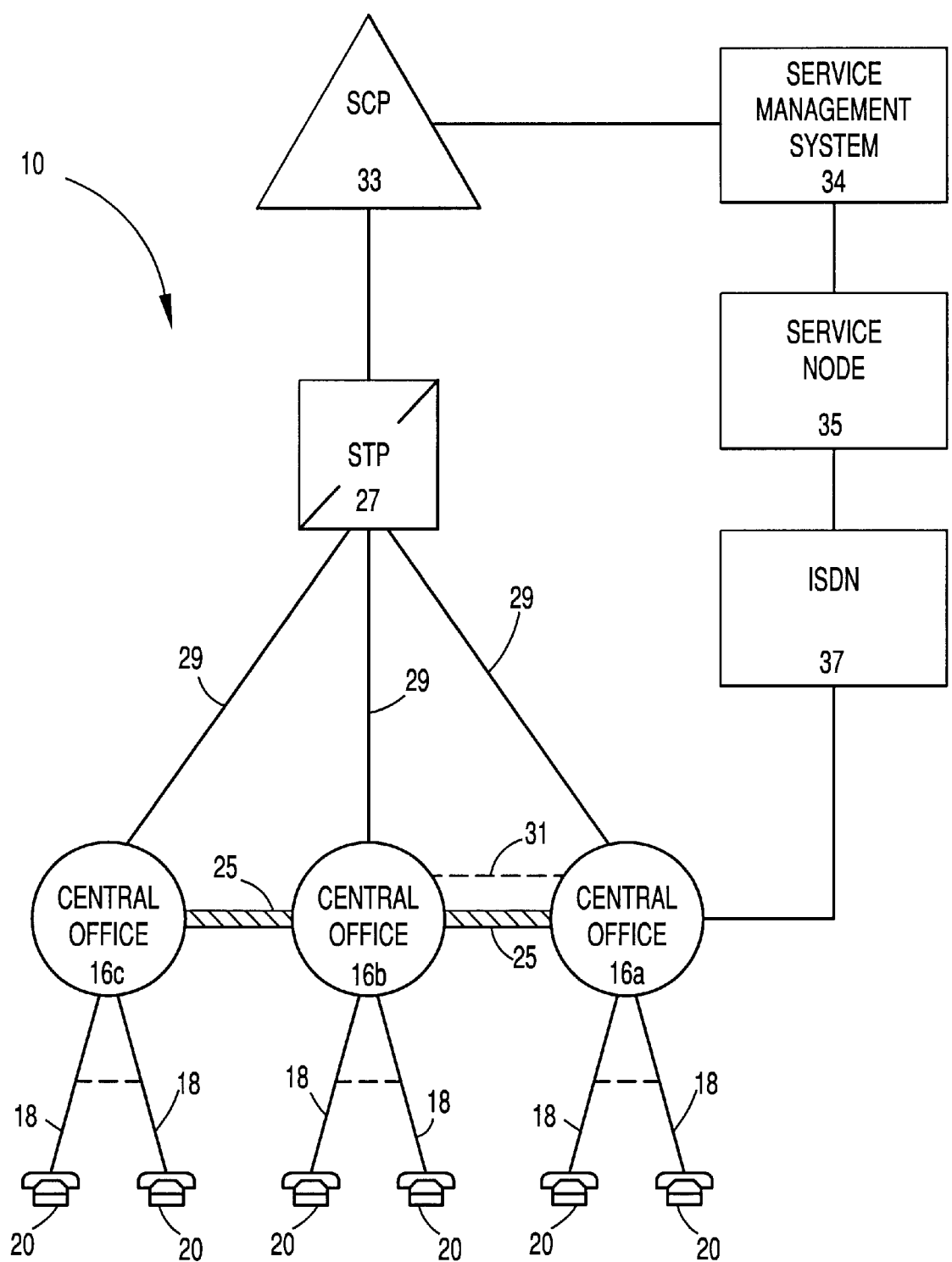
FIG. 2 is a block diagram illustrating a preferred environment for a telecommunications network in accordance with the exemplary embodiment of the present invention.

Referring now to the drawings, in which like numerals indicate like elements throughout the several figures, FIG. 2 is a block diagram illustrating the preferred environment for a telecommunications network.

As illustrated, the telecommunications network 10 includes Advanced Intelligent Network (AIN) elements of a typical local exchange carrier. The Advanced Intelligent Network includes a plurality of end or central offices, which are indicated as central offices 16a, 16b, and 16c in FIG. 2. Preferably, each central office includes an "SSP", which is an acronym for service switching point. A service switching point is a switch, and the terms "end office", "switch", "central office", "service switching point" and "SSP" are used interchangeably herein unless a distinction is noted. In the preferred embodiment, the service switching point is equipped with AIN software release 0.1 or higher release. For more information, see Bellcore Specification TR-NWT-001284 Switching Systems Generic Requirements for AIN 0.1, which is incorporated herein by reference. The number of central offices is arbitrary. The Advanced Intelligent Network also comprises non-SSP central office switches, but such non-SSP switches are not shown in FIG. 2. The difference between an SSP and a non-SSP switch is that an SSP includes intelligent network functionality including appropriate hardware and software so that, when a set of predetermined conditions are detected, the SSP initiates a trigger for a predetermined state of a call on a subscriber's directory number, generates the trigger as an appropriate message in the form of a data query to be sent out over the network, and suspends handling of the call until the SSP receives a response from the network instructing the SSP to take certain action. If the SSP receives no instructions within a certain amount of time, the SSP has a default task to execute with respect to the predetermined condition. A non-SSP switch is an electronic switch that can generate certain rudimentary signaling over the network, but the non-SSP switch must rely on other equipment to provide subscriber lines connected to such a non-SSP switch with more complex features and services available in the Advanced Intelligent Network.

As further illustrated in FIG. 2, central offices 16a–c have a plurality of subscriber lines commonly designated as 18 connected thereto. Each subscriber line 18 is connected to a piece of terminating equipment including a plurality of telephones commonly designated as 20. Although telephones are illustrated as the pieces of terminating equipment in FIG. 2, those skilled in the art will understand that such pieces include other telecommunication units or devices such as facsimile machines, computers, modems, etc.

Throughout this specification, the terms "subscriber", "calling party", "caller" or "called party" may be used. It should be understood that these terms need not refer to human operators of telecommunications devices or equipment, but may refer to devices that are connected to or communicate with the telecommunications network 10 such as computers, facsimile machines, modems, etc. A "call" or "communication" as described herein should be understood to refer to an attempt to establish a communication link between two elements such as a calling party and a called party, or network elements such as between a service node and a central office, as described below.

Pursuant to the preferred environment, each piece of terminating equipment in an Advanced Intelligent Network is assigned a directory number. In the description of the present invention, the term "directory number" is used in its generally understood meaning to be the number which is dialed or input by a caller or source and used by the network to route the communication so as to reach a piece of terminating equipment associated with the dialed directory number. A directory number is commonly referred to as a telephone number. In the present application, the term "terminates" is used with the terms "call" or "communication" pursuant to their meaning in the field of telephony to mean an ultimate connection of a call or connection to equipment associated with the called party.

Referring again to FIG. 2, central offices 16a, 16b are illustrated as interconnected by a plurality of trunk circuits 25. These are the voice path trunks that interconnect the central office switches to connect communications. It should be understood that central office trunking in a typical urban environment is not limited to a daisy chain arrangement as implied by FIG. 2. In other words, in a typical network, trunk circuits exist between central office switch 16a or 16b and the central office switches 16b or 16c and other central offices serving other pieces of terminating equipment.

Each of the central offices in the network 10 is typically connected to a local signal transfer point (STP) 27 via respective data links commonly designated 29. These data links employ a signaling protocol referred to as Common Circuit Signaling System 7 (CCS7), which is well known to those skilled in the art. Also, central offices 16a, 16b are illustrated as connected by data link 31.

Much of the intelligence of the Advanced Intelligent Network resides in a local SCP (SCP) 33. Typically, an SCP is connected to one or more SSPs through a respective one or more STPs over CCS7 data links. Among the functions performed by SCPs is the maintenance of network databases which are used in providing telecommunication services. In addition, SCPs include databases such as a subscriber information database that identify particular service subscribers and the services to be accorded to these subscribers.

The SCP databases and other databases (memory or storage) of other network elements (such as service node 35 described below) are updated with information from a service management system 34 through an CCS7 data link.

As also illustrated in FIG. 2, an Advanced Intelligent Network typically (in the AIN 0.2 software release) includes a telecommunications element referred to as a service node 35 (SN). A service node also may be referred to as a "services circuit node" (SCN), or simply as "platform" in some cases. Those skilled in the art will be familiar with a service node, which is physically implemented by the same types of computers that embody the SCP 33. In addition to the computing capability and database maintenance features, service node 35 also includes switching fabric, voice and DTMF signal recognition devices and voice synthesis devices.

Although service node 35 is physically quite similar to SCP 33, service nodes are used principally when some enhanced feature or service requires user interaction, an audio connection to the call or transfer of a significant amount of data to a subscriber over a switch connection during or following a call. A service node also is used in routing and setting up communications such as conference calls as is described in more detail below. A service node is typically connected to one or more switches via an integrated services digital network (ISDN) link 37. For example, FIG. 2 illustrates that service node 35 is connected to central office 16b. Thus, services that require real-time communication with a subscriber (or calling or called party) during a communication usually employ the facility of a service node such as service node 35.

As is well known to those skilled in the art, the Advanced Intelligent Network may also include other elements and connections that have not been described herein unless their form or function is affected as a result of the implementation of the present invention in the AIN.

The foregoing description is a basic overview together with a few examples of the operation of the Advanced Intelligent Network that is a modern public switched telephone network. In summary, the AIN is a complex, high-speed, high-traffic-volume packet-switched messaging arrangement that provides a great deal of versatility in the handling of telecommunications. Additional information regarding the public switched telecommunications network and the AIN may be obtained from the commonly assigned patent to Weisser, U.S. Pat. No. 5,430,719, which is incorporated herein by reference.

An Exemplary Embodiment For Delivering A Message In A CNAM Environment

Figure 3:
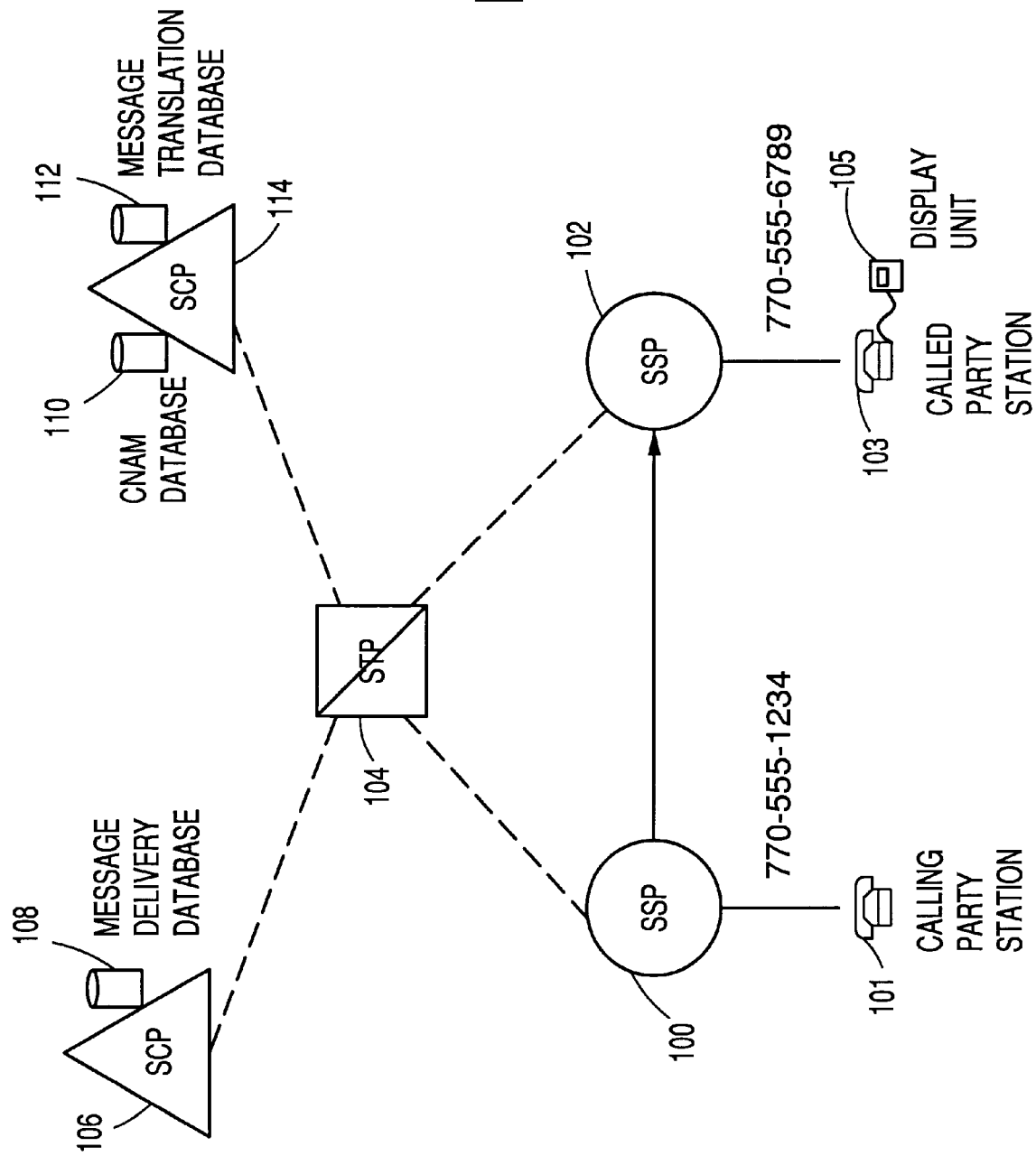
FIG. 3 is a block diagram illustrating an exemplary embodiment for delivering a message in a CNAM environment in accordance with the exemplary embodiment of the present invention.

With continuing reference to FIG. 2 and now turning to FIG. 3, an overview of an exemplary embodiment for delivering a message in a CNAM environment is described. FIG. 3 illustrates an exemplary embodiment utilizing a message delivery database 108 and a message translation database 112 as preferred sources of information. It will be appreciated by those skilled in the art that the present invention is not limited to delivering messages, but may also include delivering other information which may be suited for this environment, such as product orders and registrations.

An overview of this exemplary embodiment is presented by way of example. Assume a telecommunications service provider provides service to a calling party and a called party. Service is provided to the calling party from an SSP 100, and service is provided to the called party from a different SSP 102. The called party is a CNAM subscriber having a display unit 105 connected to the line serving the called party. It will be appreciated by one skilled in the art that a display unit can be any type display device suitable for the CNAM environment, such as a CNAM display unit, specifically the Northern Telecom 350, a computer display screen, an ADSI compatible telephone, an ADSI telephone, such as a BellCore specified Type III CPE unit, which is capable of operating with CNAM on a call waiting service, a BellCore specified Type II CPE unit, which is a display unit capable of adapting a non-ADSI telephone for use with CNAM on a call waiting service, and so forth. ADSI telephones are described in commonly-owned U.S. Pat. No. 5,416,831, to Chewning, III et al., the disclosure of which is expressly incorporated herein by reference.

The called party also subscribes to a message delivery service that allows the called party to receive messages from calling parties via display unit 105. The calling party desires to leave a message for the called party whose directory number is 770-555-6789. The calling party places a call from a calling party station 101 having a calling party directory number (770-555-1234). The call is placed to a special directory number or code number, which is designated by the service provider for accessing the message delivery service. In this example, the code number is "#00". Further, for this example, the SSPs have been provisioned with a trigger with respect to the code number, and in particular, with respect to #00.

Once the code number is dialed, a communication is received at the SSP 100. The SSP 100 detects a trigger, which was set in the SSP 100 in association with the code number. The SSP 100 then launches a query via STP 104 to an AIN element 106, such as an SCP, for instructions on how to proceed with the communication. Specifically, the SSP 100 populates routing parameters in a query package with routing and code specific information associated with AIN elements and services, as well as directory numbers associated with the calling party and the called party.

Figure 4:
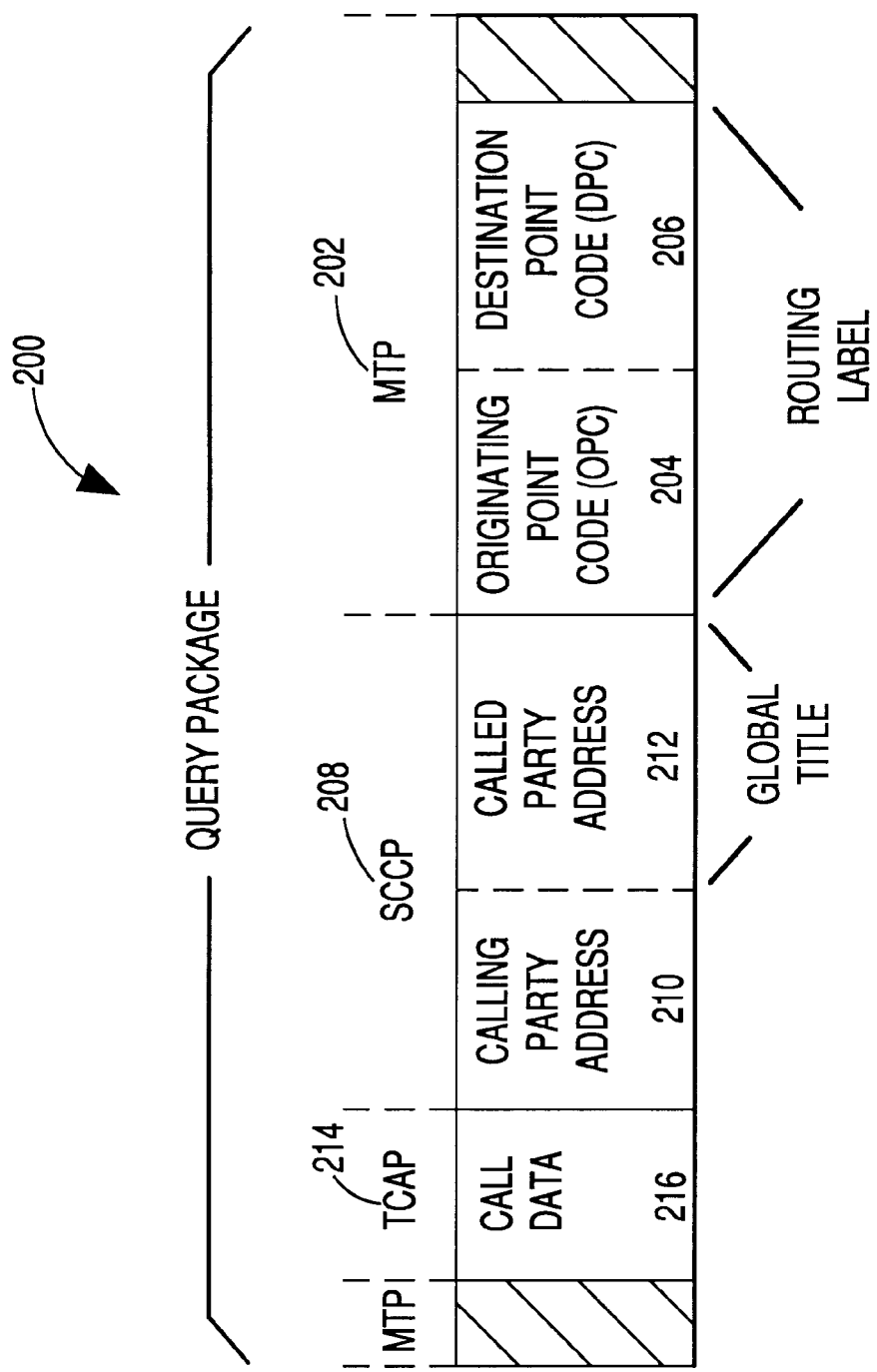
FIG. 4 is a diagram illustrating a typical query package in accordance with the exemplary embodiment of the present invention.

With continuing reference to FIG. 3 and now turning to FIG. 4, a typical query package is now described. FIG. 4 illustrates a query package 200, which may be transmitted to the SCP 106 via STP 104 pursuant to this exemplary embodiment. The query package 200 includes the following parameters: a message transfer part (MTP) 202, a signaling connection control part (SCCP) 208, and a transaction capability application part (TCAP) 214. The MTP parameter 202 contains the routing label, which consists of an originating point code (OPC) 204 and a destination point code (DPC) 206. The SCCP parameter 208 contains a calling party address parameter 210 and a called party address parameter 212, also known as the global title. The TCAP parameter 214 is a data field that contains call data 216 for database services. These parameters are populated by the SSP 100 with the type of information previously described.

For example, a transaction identification (not shown) in the TCAP parameter 214 is assigned a unique value for the specific communication. In addition, a trigger type in the TCAP parameter 214 is set to identify the type of trigger the SSP 100 detected, and a service key in the TCAP parameter 214 is set to the code number. The process of populating the parameters of the query package 200 with the appropriate information is well known to those skilled in the art.

After these parameters are populated with the appropriate information by the SSP 100, the query package 200 is sent to the STP 104. The STP 104 reformats the query package 200 with final routing information. Specifically, the STP 104 performs a global title translation (GTT) and changes the DPC 206 so that the query package 200 is routed to the appropriate SCP, in this case, SCP 106. The STP 104 also changes a subsystem number (SSN) (not shown), which is a part of the called party address 212, so that a specific service package application is accessed within a subsystem of the SCP 106. Service package applications are service packages for AIN services, such as voice mail services, calling name services, and message delivery services. Service package applications are located within the SCP and are capable of processing several communications at the same time. In this example, the SSN is changed so that the message delivery service is accessed when the SCP 106 receives the query package 200.

After the STP 104 performs the GTT, the query package 200 is sent to the SCP 106. The SCP 106 sends a conversation message of a play-and-collect message type to the SSP 100. The play-and-collect message includes the identification of an announcement to be played.

Generally described, the SCP 106 instructs the SSP 100 to play the announcement and collect digits. Digits are numbers and characters located on a telephone keypad or input device, such as a keyboard. The conversation message is sent to the SSP 100 as a result of the message delivery service invoking a prompt for the calling party to enter information to use the service.

When the SCP 106 formulates the conversation message, the SCP 106 populates the identification of the announcement to be played in the TCAP parameter 214 of the conversation message. The SCP 106 also changes the routing label so that the conversation message is routed through the STP 104 to the SSP 100. Specifically, the SCP 106 changes the DPC 206 to the destination code for the SSP 100 so that the conversation message points to the correct SSP 100, and the SCP 106 changes the OPC 204 to the originating code of the SCP 106. The SSN serves as an indicator for routing the conversation message to the correct subsystem within the SSP 100. The transaction identification identifies which communication to apply the play-and-collect message. Moreover, the transaction identification remains the same for all messages included in the transaction until the transaction is terminated.

The SSP 100 responds to the SCP 106 with a conversation message containing the collected digits or an error code. Specifically, the SSP 100 plays an announcement to the calling party, collects digits entered by the calling party, and returns a conversation message containing the collected digits to the SCP 106. The SSP 100 also populates the conversation message with appropriate routing information based on the information received in the SCP's play-and-collect message.

As applied to the exemplary embodiment of the present invention, four separate conversations take place between the SCP 106 and SSP 100. In the first conversation, the SCP 106 sends a conversation message to the SSP 100 instructing the SSP 100 to play an announcement to the calling party requesting the calling party to enter a called party directory number. The SSP 100 plays the announcement to the calling party and waits for input from the calling party. At this stage, the calling party enters the called party directory number via telephone keypad. It will be appreciated by those skilled in the art that the present invention is not limited to entering data using a telephone keypad, but may also include using a computer keyboard, voice, tone, or any other suitable mechanism for entering information. The SSP 100 then collects the digits entered by the calling party and returns a conversation message containing the collected digits to the SCP 106. The SCP 106 retrieves and stores the collected digits.

In the second conversation, the SCP 106 sends a conversation message to the SSP 100 instructing the SSP 100 to play an announcement containing a list of messages to the calling party and to request the calling party to select a message from the list of messages. The SSP 100 plays the list of messages and prompts the calling party to select a message from the list of messages. The calling party listens to the list of messages and selects a message by pressing a key or combination of keys corresponding to the message the calling party prefers. The SSP 100 collects the entered digit or digits and returns a conversation message containing the collected digit or digits to the SCP 106. The SCP 106 retrieves and stores the collected digit or digits.

As previously mentioned, each message preferably corresponds to a key or combination of keys on the telephone keypad. For example, the SSP 100 may play the list of messages shown below in Table 1. Table 1 also shows the corresponding number that the calling party presses to select a specific message.

TABLE 1

Message/Key Combination

| Message | key |
|---|---|
| Meeting today at _____. | 1 |
| Call ASAP | 2 |
| Emergency | 3 |
| Appointment canceled | 4 |
| Call _____ at _____. | 5 |

For simplicity, assume the calling party selects the "Call ASAP" message by pressing key 2. However, in cases where the calling party is required to enter additional information to complete a message, for example when the calling party presses the "1" key or the "5" key in association with Table 1 above, the SSP 100 provides a prompt for the calling party to add more specific information. For instance, if the calling party presses the "1" key which corresponds to the message "Meeting today at __.", the calling party is also asked to enter the time of the meeting by pressing the appropriate keys. It will be appreciated by those skilled in the art that the present invention is not limited to the list of messages provided in Table 1. Further, the list of messages may also vary from one subscriber to another. The subscriber may select a preferred list of messages to suit the subscriber's needs when setting up the message delivery service.

After the SCP 106 retrieves and stores the digits collected by the SSP 100 in the second conversation, a third conversation takes place. In this third conversation, the SCP 106 sends a conversation message to the SSP 100 instructing the SSP 100 to replay the message chosen by the calling party and to request verification that the played message is the message chosen by the calling party. The SSP 100 acts accordingly. The calling party listens to the message replay and determines whether the played message is the message that the calling party chose. The calling party then enters a response by pressing a key corresponding to either a "correct" or an "incorrect" message. The SSP 100 collects the entered digit and returns a conversation message containing the collected digit to the SCP 106. The SCP 106 retrieves the collected digit from the SSP 100.

If the calling party presses the key corresponding to an incorrect message, then the second and third conversations are repeated until the calling party verifies that the message is correct. If no verification is received, the system may employ a default mechanism, and the calling party may have to repeat the entire process of entering the called party directory number and so forth.

After the calling party verifies that the message replay is correct and this information is retrieved by the SCP 106, a fourth conversation takes place. The SCP 106 sends a conversation message to the SSP 100 instructing the SSP 100 to play an announcement requesting the calling party to remain on the telephone until some predetermined time period for confirmation that the message has been sent to the called party. The SSP 100 performs accordingly. At this stage, the calling party may be asked to stay on the telephone for a predetermined amount of time, such as until the calling party hears two rings. After the two rings, the calling party may then hang up the telephone.

While the calling party is waiting for the two rings, the SCP 106 consults the message delivery database 108. The message delivery database 108 is located preferably as a part of the SCP 106, as shown in FIG. 3. Those skilled in the art will understand that the message delivery database 108 may be separate from an SCP, or incorporated as part of another network element such as a service node or even a switch. The message delivery database 108 stores a prefix in association with each message.

The SCP 106 searches the message delivery database 108 to find the prefix corresponding to the selected message. The prefix typically consists of five to six characters. The message delivery database performs a look-up in its message table to match the selected message with the list of messages to find a corresponding prefix. For example, as shown in Table 2, the selected message, Call ASAP, which corresponds to the "2" key generates the prefix, 00408.

TABLE 2

Prefix/Message Processing

| Prefix | Message | key |
|---|---|---|
| 01020 | Meeting today at _____. | 1 |
| 00408 | Call ASAP | 2 |
| 00528 | Emergency | 3 |
| 00628 | Appointment canceled | 4 |
| 01023 | Call at _____. | 5 |

After obtaining the prefix, 00408, the SCP 106 sends a query response message to the SSP 100 via STP 104, which performs a global title translation. The SCP 106 provides instructions for routing the communication and reformats the calling party address parameter by adding a prefix before the calling party directory number. In this example, the calling party address is "00408*7705551234". The asterisk ("*"), which separates the prefix and the calling party directory number, is a delimiter character. One purpose of the delimiter character is to distinguish the calling party directory number from the prefix for calling party directory number recognition. Other possible delimiter characters include "#" and "0".

The SSP 100 retrieves the query response message and sets up the communication for transmission to the SSP 102 that serves the called party. The communication is set up by populating various parameters in an integrated services digital network user part (ISUP) signaling message with appropriate routing information, the calling party directory number as modified by the SCP 106, and a presentation parameter, which allows a CNAM display. The ISUP signaling message employs a common circuit signaling system 7 (CCS7) call set up protocol as previously mentioned.

The SSP 100 then routes this information in the ISUP signaling message to the SSP 102. The SSP 102 detects a trigger associated with the called party directory number. The SSP 102 halts the calling process and launches a query via STP 104 to an AIN element 114, such as an SCP, for message translation. Specifically, the SSP 102 populates the called party address with the modified calling party directory number and submits it as data with the query. The query package is sent to the STP 104. The STP 104 performs a global title translation, which is determined by the delimiter character, and changes the routing information so that the query is forwarded to the appropriate SCP 114, and more specifically to the appropriate service package application within the SCP 114. The query is then forwarded to the SCP 114.

In the exemplary embodiment, as a consequence of placing the reformatted calling party directory number in the called party address parameter, the query package is routed to a message translation database 112 within the SCP 114 instead of the CNAM database 110, as is typically performed in the CNAM environment. The message translation database 112 is located preferably as a part of the SCP 114, as shown in FIG. 3, but may be separate from the SCP 114, or incorporated as a part of another network element such as the service node or even another switch.

The message translation database 112 translates the prefix to a message by matching the prefix in the called party address parameter with its corresponding message in the message translation database 112. The SCP 114 sends the message to the SSP 102 via STP 104 in the TCAP parameter of a query response message. The SSP 102 retrieves the message from the STP 104 and delivers the message along with the modified calling party directory number and the date and time of the communication to the called party at a called party station 103. This information is then displayed on the called party's display unit 105. In this example, the message "Call ASAP" is displayed on the called party's display unit. The called party is still able to answer the call although the message has been displayed on the display unit.

The process of sending this information over the line serving the called party is achieved by using the frequency shift keying (FSK) line signaling protocol as specified in Bellcore Specification TA-NWT-000030, which is incorporated herein by reference. The called party's display unit 105 translates the FSK information and displays the associated text. The text is displayed after a predetermined period of time. In this embodiment, the text is displayed after two rings. After the calling party hears the two rings, the calling party may then hang up the telephone, and the call is terminated at the called party's display unit 105. If the calling party does not hang up the telephone, the telephone continues to ring until the call is answered. However, the message is still displayed on the display unit 105 after the second ring.

In sum, the present invention allows a calling party to send a message to a called party without having to communicate directly with the called party and without having to utilize a voice mail or answering service. For example, the calling party may desire to leave messages for called parties informing them of a meeting time and date without having to speak with each called party or to leave each called party a voice mail message. The called party can then determine the nature of the call by simply reading the display unit. Advantageously, the called party can also determine the nature of an incoming call while continuing a conversation with another caller by viewing the display unit for the incoming message. It will be appreciated by those skilled in the art that the present invention is not limited to sending only one message to a called party, but the present invention is also capable of sending multiple messages to one called party in one communication and sending the same message to multiple called parties in one communication.

An Exemplary Operation For Delivery Of Information In A CNAM Environment

Figure 5A:
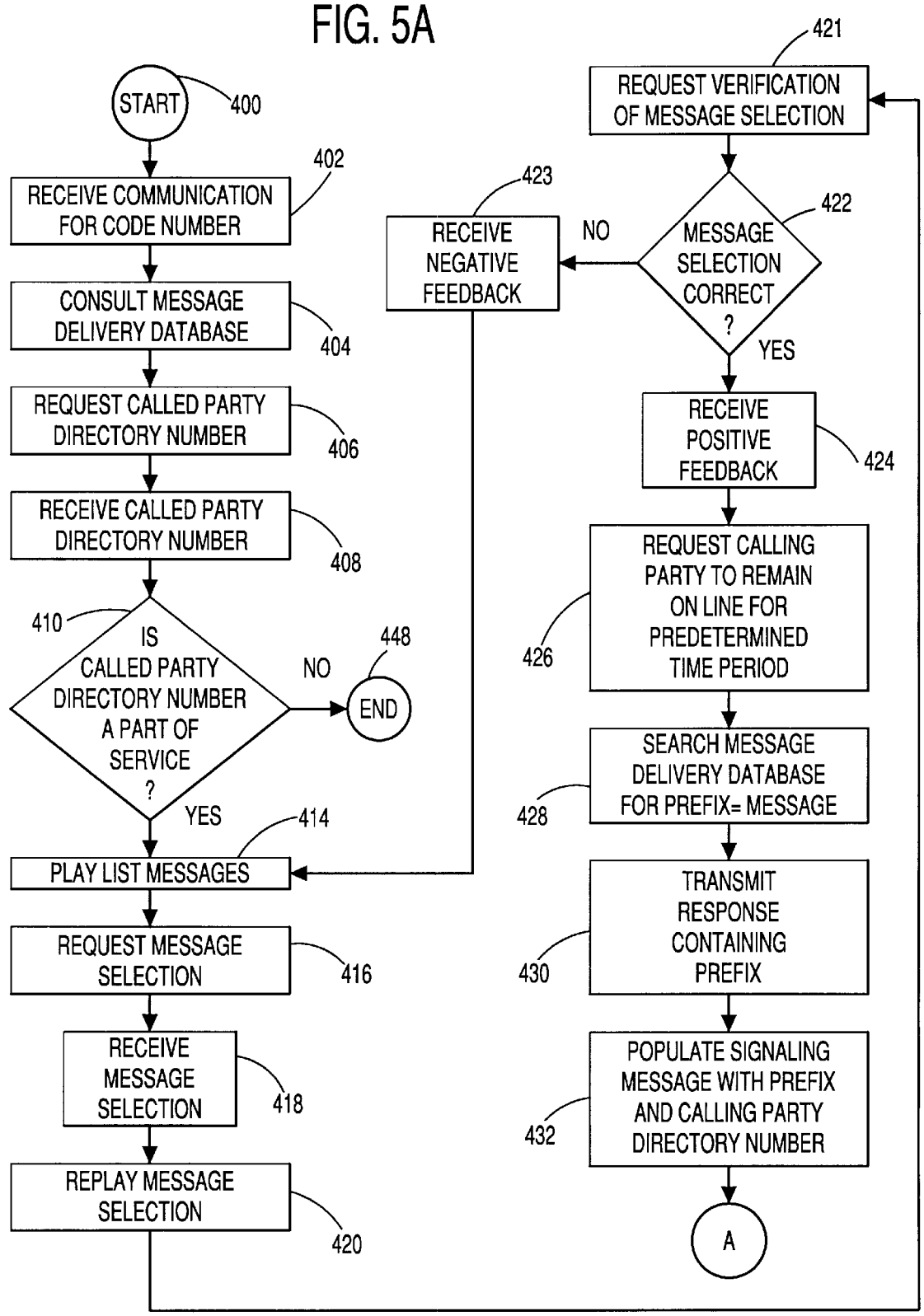
FIG. 5, consisting of FIGS. 5A and 5B, includes flow diagrams illustrating exemplary steps for delivering information obtained from a message delivery database in a CNAM environment in accordance with the exemplary embodiment of the present invention.
Figure 5B:
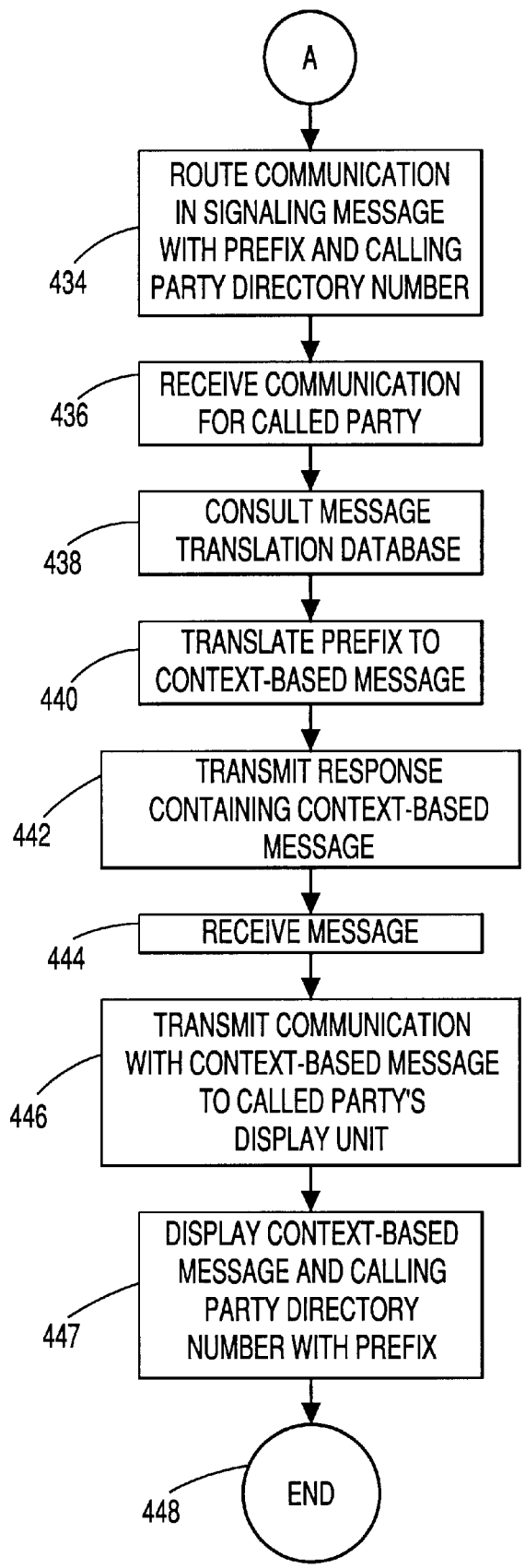

With continuing reference to FIGS. 1–4, the flow diagrams of FIGS. 5A and 5B illustrate exemplary steps for delivering information obtained from a message delivery database in a CNAM environment.

The exemplary operation begins in START step 400, and in step 402, a communication is received for a code number. In step 404, a message delivery database is consulted. Next, a called party directory number is requested in step 406. In response to the request, a called party directory number is received in step 408.

In step 410, a determination is made as to whether the called party directory number is a part of the CNAM delivery service. If the called party directory number is a part of CNAM delivery service, the "YES" branch is followed to step 414; otherwise, the "NO" branch is followed to the END step 448 with a message being sent to the calling party indicating that the called party directory number is not a part of the CNAM delivery service for this subscriber.

In step 414, a list of messages is played based on the CNAM subscriber's preferred menu selection. Next, in step 416, a message selection is requested. The message selection is received by the message delivery database in step 418. In response to the message selection, in step 420, the selected message is replayed. A request is then made to verify the selected message in step 421.

In step 422, a determination is made as to whether the replayed message is the correct message selection. If so, the "YES" branch is followed to step 424; otherwise, the "NO" branch is followed to step 423. In step 424, positive feedback is received indicating that the replayed message is the correct message selection. In step 423, negative feedback is received indicating that the replayed message is not the correct message. If the latter is true, the list of messages is replayed in step 414. However, if the former is true, the calling party is requested to remain on line for a predetermined time period in step 426.

In step 428, the message delivery database is searched for a prefix corresponding to the selected message. Next, in step 430, a response is transmitted containing the prefix corresponding to the selected messaged. A signaling message is then populated with the prefix and calling party directory number in step 432.

In step 434, the communication is then routed in the signaling message containing the prefix and calling party directory number. Next, in step 436, the communication is received and directed to the called party. In step 438, a message translation database is consulted for translating the prefix. The message translation database then translates the prefix to a message in step 440. In step 442, the message is transmitted in a response.

Next, in step 444, the response is received by an SSP and in step 446, transmitted in the communication containing the message to the called party's display unit. In step 447, the message is displayed along with the prefix and calling party directory number. The process terminates at the END step 448.

Figure 6:
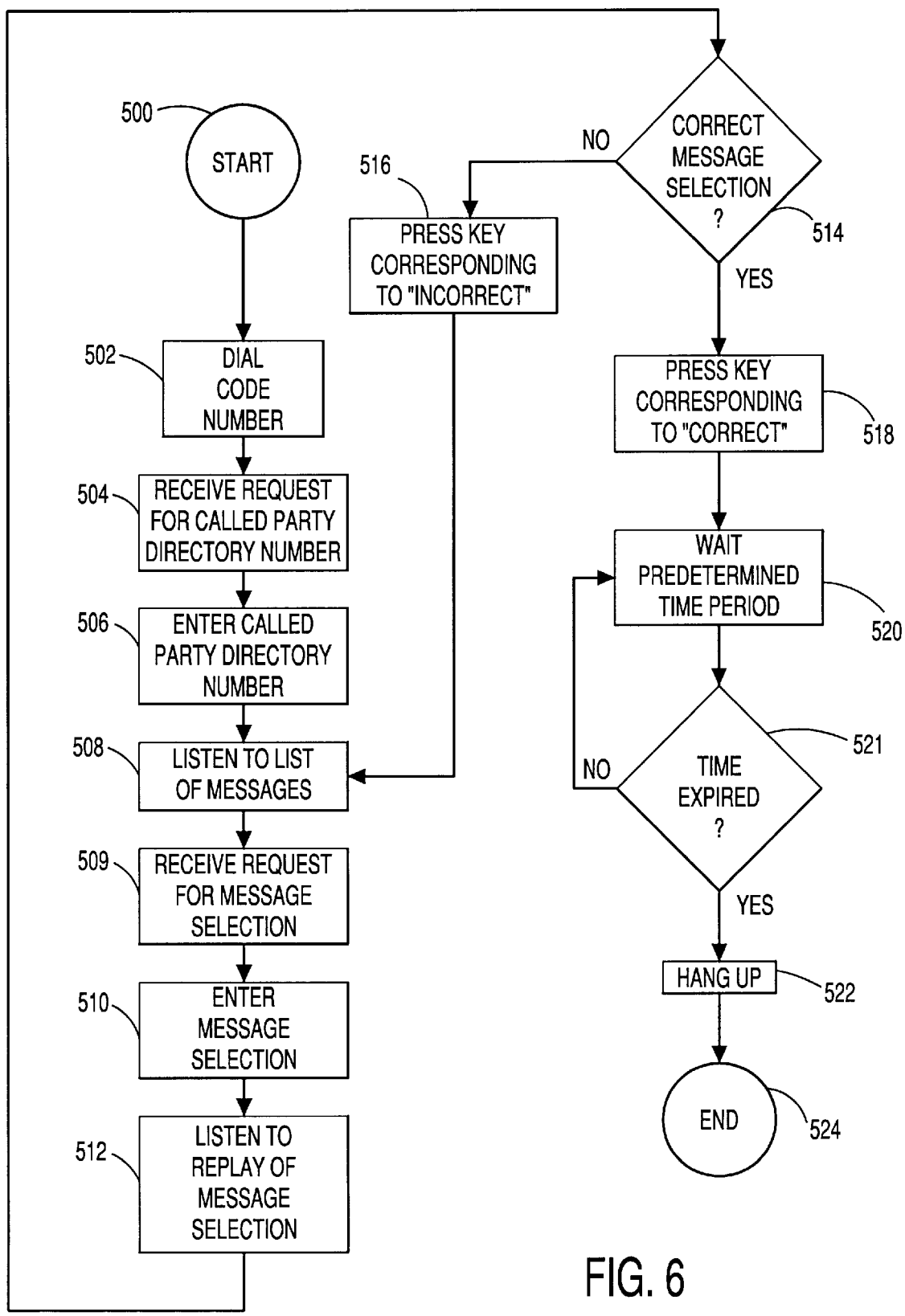
FIG. 6 is a flow diagram illustrating an exemplary process for selecting a message for transmission to a called party in accordance with the exemplary embodiment of the present invention.

An Exemplary Process For Selecting A Message For Transmission To A Called Party With continuing reference to FIGS. 1–5B, the flow diagram of FIG. 6 illustrates an exemplary process for selecting a message for transmission to a called party.

The exemplary process begins in START step 500, in which the calling party picks up the telephone, and in step 502, the calling party dials a code number. In step 504, the calling party receives a request to enter a called party directory number. In response to this request, the calling party enters the called party directory number in step 506.

The calling party listens to a list of messages in step 508, and in step 509, the calling party receives a request to enter a message selection. In step 510, the calling party enters the preferred message selection by pressing one of the numbers on the telephone key pad corresponding to the message selection. Next, in step 512, the calling party listens to a replay of the selected message.

In step 514, a determination is made as to whether the calling party entered the correct message selection. If the message selection is correct, the "YES" branch is followed to step 518; otherwise, the "NO" branch is followed to step 516. In step 516, the calling party presses the number on the telephone key pad which corresponds to "incorrect". As a result of pressing the number corresponding to "incorrect", the process is repeated beginning at step 508, in which the calling party listens to the list of messages again before choosing another message selection.

In step 518, the calling party presses a number on the telephone key pad corresponding to "correct". The calling party then remains on the line for a predetermined time period in step 520. For example, the calling party may remain on the line until the calling party hears two rings. Next, a determination is made as to whether the predetermined time period has expired. If so, the "YES" branch is followed to step 522, in which case the calling party then hangs up the telephone. Otherwise, the "NO" branch is followed to step 520, in which case the calling party continues to remain on the line. The process terminates at the END step 524.

An Alternative Embodiment For Delivering A Message In A CNAM Environment

Figure 7:
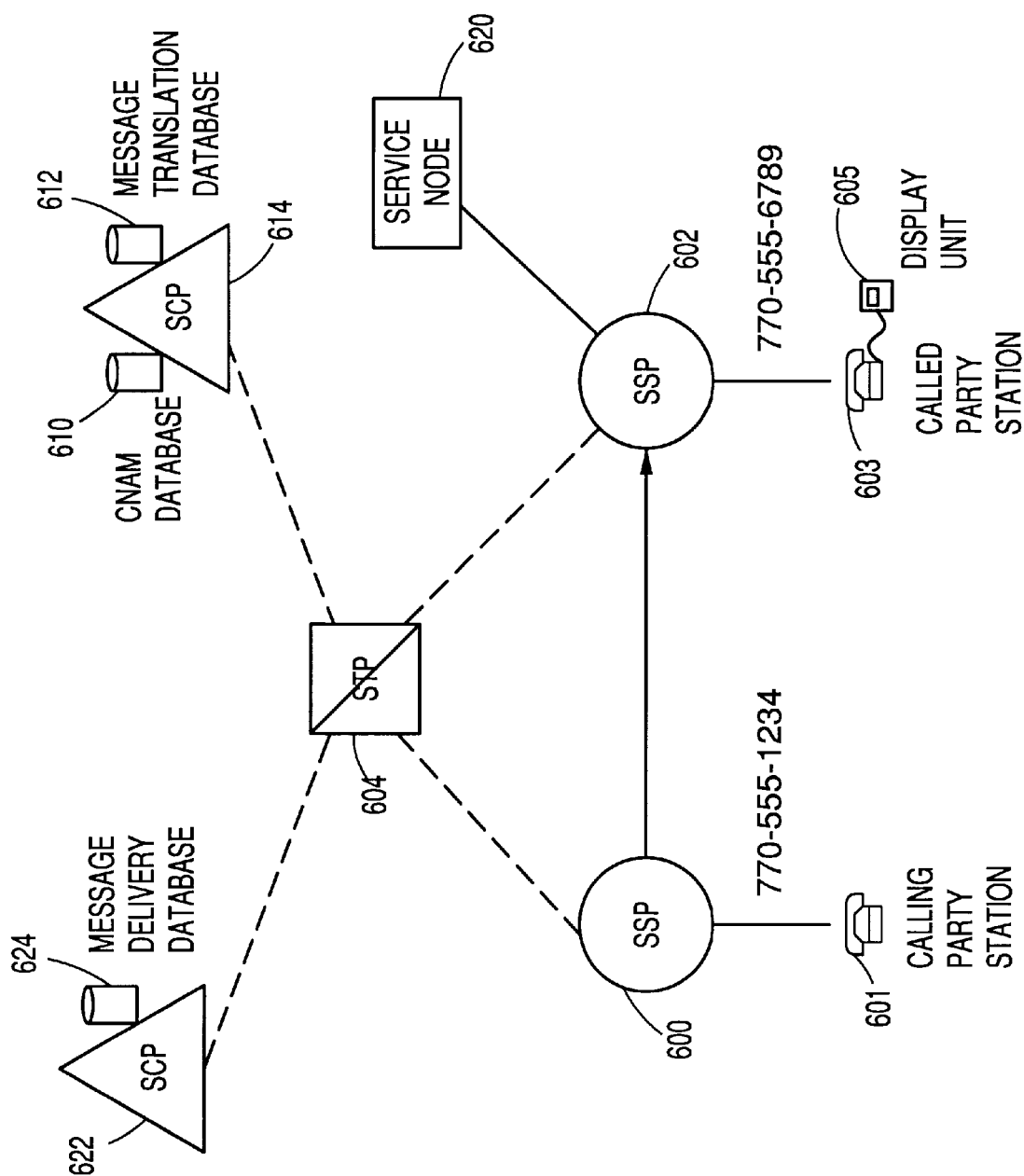
FIG. 7 is a block diagram illustrating an alternative embodiment for delivering a message in a CNAM environment.

Now turning to FIG. 7, a diagram illustrating an alternative embodiment for delivering a message in a CNAM environment is described.

In FIG. 7, a calling party places a call from a calling party station 601 having a calling party directory number (770-555-1234) to a called party at a called party station 603 having a called party directory number (770-555-6789). The called party is a CNAM subscriber having a display unit 605 connected to the line serving the called party. An SSP 600 serving the calling party station 601 receives the communication and sets up the communication to an SSP 602 serving the called party station 603. The call is set up in a conventional manner, wherein the SSP 600 obtains appropriate routing information as previously described with respect to prior art FIG. 1, and populates an initial address message with the calling party directory number, the called party directory number, and a presentation parameter, which allows a CNAM display. The SSP 600 then sends this information in a signaling message to the SSP 602.

Because the called party is a CNAM subscriber, a trigger is set in the SSP 602 in association with the called party directory number. The SSP 602 detects the trigger, halts the calling process, and launches a calling name query to a network element, such as an SCP 614 via STP 604. The SCP 614 searches a CNAM database 610 for the calling party's record from which it retrieves the associated name. The SCP 614 then returns the name associated with the calling party directory number in a TCAP response to the SSP 602. The SSP 602 completes the communication by sending the calling party's name and calling party directory number, as well as the date and time of a communication, to the called party's display unit 605, which displays this information.

If there is no answer from the called party station 603 after a predetermined time period, for example, three rings, the SSP 602 routes the communication to a service node 620 acting as a voice mail system for taking messages. The voice mail system allows the calling party to leave the called party an audio message, as well as to select an option for leaving a message on the calling party's display unit 605. When the option for leaving a message on the calling party's display unit 605 is selected, the service node 620 acts on behalf of the calling party by placing a call to the special directory number or code number, which is designated by the service provider for accessing a message delivery service, as described above with respect to FIG. 3.

Once the code number is dialed, a communication is received at the SSP 600. The SSP 600 detects a trigger, which was set in the SSP 600 in association with the code number. The SSP 600 then launches a query via STP 604 to an SCP 622 for instructions on how to proceed with the communication. Specifically, the SSP 600 populates routing parameters in a query package with routing and code specific information associated with AIN elements and services, as well as directory numbers associated with the calling party and the called party, as previously described with respect to FIG. 3.

After these parameters are populated with the appropriate information by the SSP 600, the query package is sent to the STP 604. The STP 604 reformats the query package with final routing information so that the query package is sent to the appropriate SCP, in this case, SCP 622, and so that the message delivery service is accessed when the SCP 622 receives the query package.

After the STP 604 reformats the query package, the query package is sent to the SCP 622. The SCP 622 sends conversation messages instructing the SSP 600 to obtain specific information from the calling party, as described above with respect to FIG. 3. Specifically, the SSP 600 collects and sends to the SCP 622: 1) the called party directory number; 2) the message selection; and 3) the message verification.

The SCP 622 consults a message delivery database 624, which is similar to the message delivery database 108 described with respect to FIG. 3, and searches the message delivery database 624 to find a prefix corresponding to the selected message. After obtaining the prefix, the SCP 624 sends a query response message to the SSP 600 via STP 604. The SCP 624 provides instructions for routing the communication and reformats the calling party address parameter by adding a prefix before the calling party directory number.

The SSP 600 retrieves the query response message and sets up the communication for transmission to the SSP 602 that serves the called party, as previously mentioned with respect to FIG. 3.

The SSP 600 then routes this information in the ISUP signaling message to the SSP 602. The SSP 602 detects a trigger associated with the called party directory number. The SSP 602 halts the calling process and launches a query via STP 604 to the SCP 614, for message translation, according to the procedure described in FIG. 3.

Instead of routing the query package to the CNAM database 610, as was previously performed, the query package is routed to a message translation database 612, which is similar to the message translation database 112 in FIG. 3, within the SCP 614.

The message translation database 612 translates the prefix to a message, and the SCP 614 sends the message to the SSP 602 via STP 604. The SSP 602 retrieves the message from the STP 604 and delivers the message along with the modified calling party directory number and the date and time of the communication to the called party at a called party station 603. This information is then displayed on the called party's display unit 605, as described in connection with FIG. 3.

In essence, a primary difference between the exemplary embodiment and the alternative embodiment is that in the exemplary embodiment, the calling party accesses the message delivery database directly by dialing a code number, and in the alternative embodiment, the calling party accesses the message delivery database indirectly by dialing the called party. Another difference between the two embodiments is that the exemplary embodiment utilizes two databases, whereas the alternative embodiment can be designed to implement the delivery of a message by utilizing a service node, in addition to the two databases. Moreover, in the alternative embodiment, a message is delivered to the called party station only in cases where the called party does not answer the call, thereby triggering the voice mail system, whereas in the exemplary embodiment, the message is delivered after a predetermined time period regardless of whether or not the called party answers the call.

Conclusion

In sum, the present invention allows a calling party to send a message to a called party via display unit. Consequently, the present invention provides a mechanism for determining the nature of a call without having to answer the call and for determining who has called without having to check an answering machine or voice mail system.

Alternative embodiments will become apparent to those skilled in the art to which the present invention pertains without departing from its spirit and scope. Accordingly, the scope of the present invention is defined by the appended claims rather than the foregoing description.

What is claimed is:

1. With respect to a communication, a method for transmitting a message obtained from a message delivery database in a calling name delivery service environment, comprising the steps of:

(a) receiving a communication from a calling party directory number and directed to a code number;

(b) in response to the communication, obtaining a called party directory number associated with the communication;

(c) with respect to the communication, receiving an indication from a calling party of a selected message from a list of messages;

(d) obtaining a prefix corresponding to the selected message from the message delivery database;

(e) populating the prefix and the calling party directory number in a signaling message pertaining to the communication;

(f) transmitting the signaling message containing the prefix and the calling party directory number to a network element serving the called party directory number;

(g) in response to receipt of the signaling message of the network element, obtaining a message translation of the prefix from a message translation database; and (h) transmitting the message translation to a called party display unit.

2. The method of claim 1, further comprising the step of displaying the message translation on the called party display unit.

3. The method of claim 1, wherein the steps of obtaining the called party directory number and receiving an indication of a selected message from a list of messages are based upon input provided by a calling party.

4. The method of claim 1, further comprising the step of determining whether the selected message is accurate before obtaining the prefix corresponding to the selected message from the message delivery database.

5. The method of claim 4, wherein if the selected message is accurate, then receiving a confirmation signal.

6. The method of claim 4, wherein if the selected message is inaccurate, then receiving a cancellation signal.

7. The method of claim 6, wherein if the cancellation signal is received, then repeating the step of receiving an indication of a selected message from a list of messages.

8. The method of claim 1, wherein the step of populating the prefix and the calling party directory number in a signaling message further comprising the step of placing the prefix in front of the calling party directory number so that the prefix precedes the calling party directory number.

9. With respect to a communication, a method for transmitting a message obtained from a message delivery database in a calling name delivery service environment, comprising the steps of:

(a) receiving a communication from a calling party directory number and directed to a code number;

(b) in response to receiving the communication, obtaining a called party directory number associated with the communication;

(c) with respect to the communication, receiving an indication from a calling party of a selected message from a list of messages;

(d) obtaining a prefix corresponding to the selected message;

(e) populating the prefix and the calling party directory number in a signaling message associated with the communication; and (f) transmitting the signaling message containing the prefix and the calling party directory number to a network element serving the called party directory number.

10. The method of claim 2, further comprising the steps of:

in response to receipt of the signaling message of the network element, obtaining a message translation of the prefix from a message translation database; and transmitting the message translation to a called party display unit.

11. The method of claim 10, further comprising the step of displaying the message translation on the called party display unit.

12. The method of claim 2, wherein the steps of obtaining the called party directory number and receiving an indication of a selected message from a list of messages are based upon input provided by a calling party.

13. The method of claim 9, further comprising the step of determining whether the selected message is accurate before obtaining the prefix corresponding to the selected message from the message delivery database.

14. The method of claim 13, wherein if the selected message is accurate, then receiving a confirmation signal.

15. The method of claim 14, wherein if the selected message is inaccurate, then receiving a cancellation signal.

16. The method of claim 15, wherein if the cancellation signal is received, then repeating the step of receiving an indication of a selected message from a list of messages.

17. The method of claim 9, wherein the step of populating the prefix and the calling party directory number in the signaling message associated with the communication further comprises the step of placing the prefix in front of the calling party directory number so that the prefix precedes the calling party directory number.

18. With respect to a communication, a system for transmitting a message obtained from a message delivery database in a calling name delivery service environment, comprising:

a first network element operative to receive a communication from a calling party directory number and directed to a code number, the first network element being further operative to provide the message delivery database with the code number, a called party directory number, and an indication from a calling party of a selected message;

the message delivery database functionally connected to the first network element, the message delivery database being operative to obtain a prefix corresponding to the selected message and to provide the prefix corresponding to the selected message to the first network element; and the first network element being further operative to populate the calling party directory number and the prefix corresponding to the selected message in a signaling message related to the routing of the communication, and to transmit the signaling message to a second network element.

19. The system of claim 18, further comprising:

a message translation database functionally connected to the second network element, the message transaction database being operative to obtain a translation message corresponding to the prefix;

the message translation database being further operative to provide the translation message to the second network element; and the second network element being further operative to transmit the translation message to a called party display unit.

20. The system of claim 19, wherein the called party display unit is operative to display the message translation on the called party display unit.

21. The system of claim 18, wherein the first network element being further operative to populate the calling party directory number and the prefix corresponding to the selected message in the signaling message requires that the prefix precede the calling party directory number.

22. With respect to a communication, a system for transmitting a message obtained from a message delivery database in a calling name delivery service environment, comprising:

a first network element operative to receive a communication from a calling party directory number and directed to a called party directory number and operative to transmit a signaling message relating to the routing of the communication to a second network element;

the second network element operative to route the communication to a third network element after a predetermined period;

the third network element functionally connected to the second network element, the third network element being operative to forward the communication to the first network element and directed to a code number;

the first network element being further operative to provide the message delivery database with the code number, a called party directory number, and an indication from a calling party of a selected message;

the message delivery database functionally connected to the first network element, the message delivery database being operative to obtain a prefix corresponding to the selected message and to provide the prefix corresponding to the selected message to the first network element;

the first network element being further operative to populate the calling party directory number and the prefix corresponding to the selected message in a signaling message relating to the routing of the communication, and to transmit the signaling message to a second network element;

a message translation database functionally connected to the second network element, the message translation database being operative to obtain a selected message from the list of message; and the second network element being further operative to transmit the selected message to a called party display unit.

23. The system of claim 22, wherein the called party display unit is operative to display the selected message on the called party display unit.

24. The system of claim 22, wherein the third network element is further operative to record an audio message.

* * * * *